United States Patent Office 3,748,249
Patented July 24, 1973

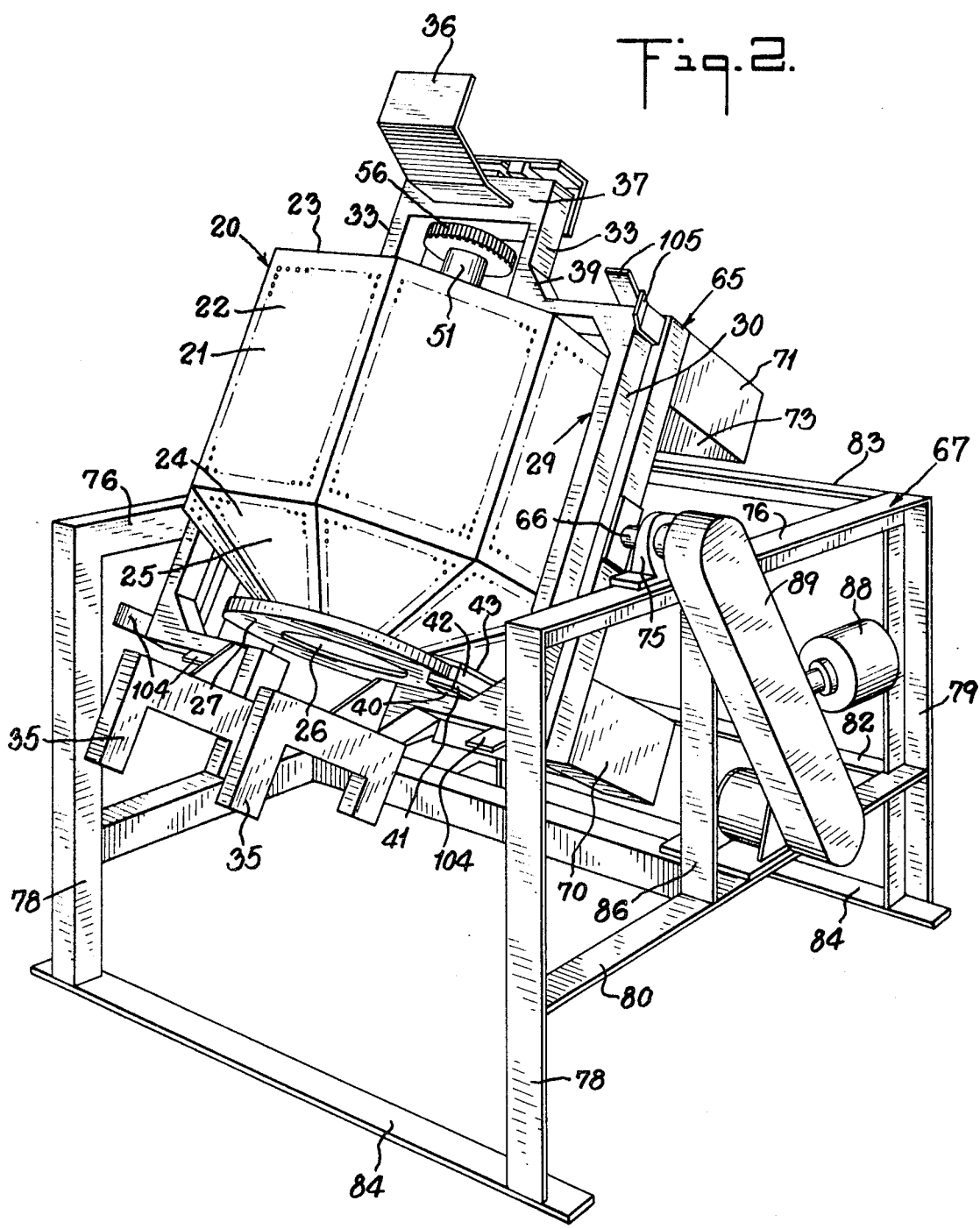

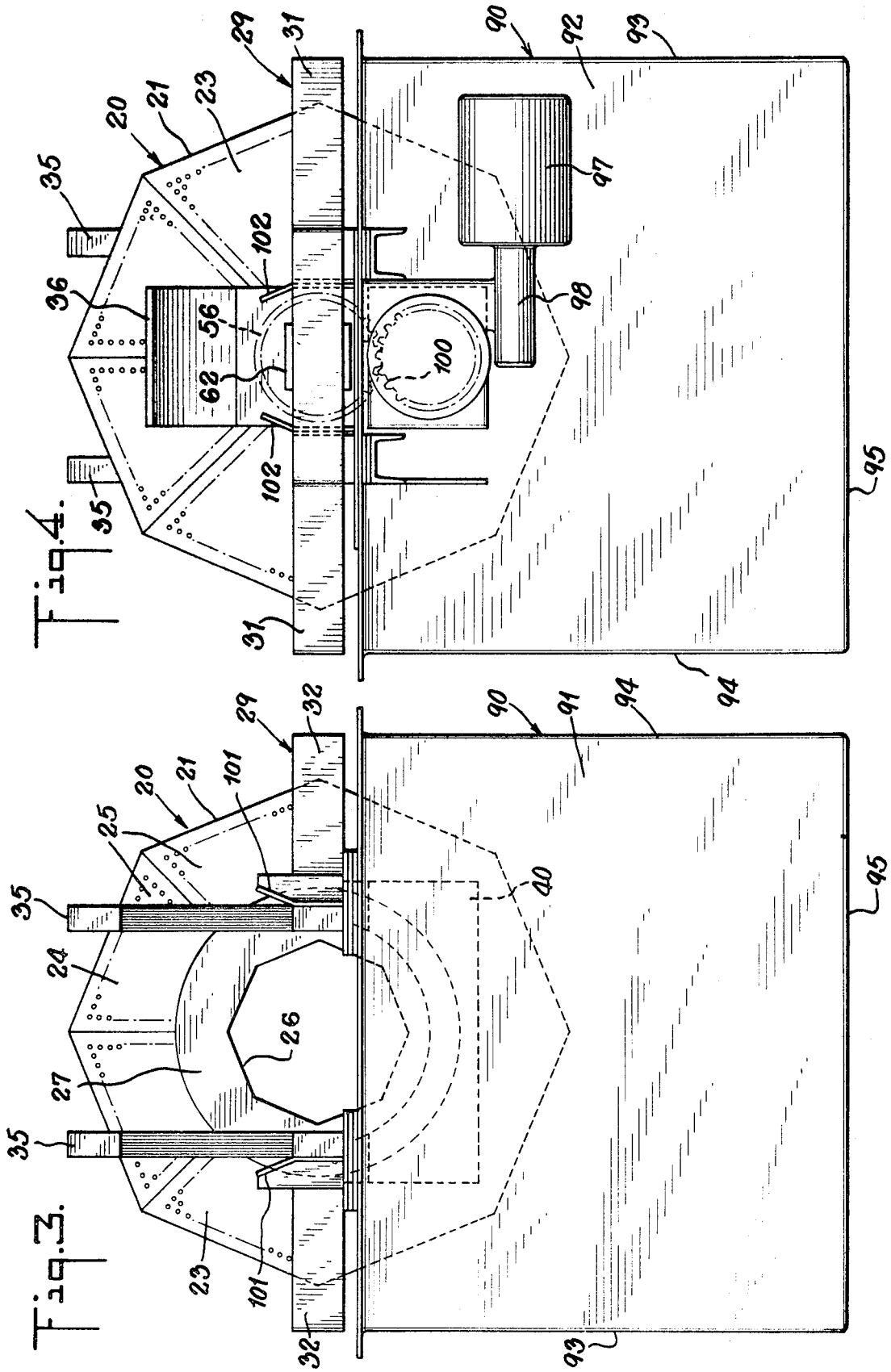

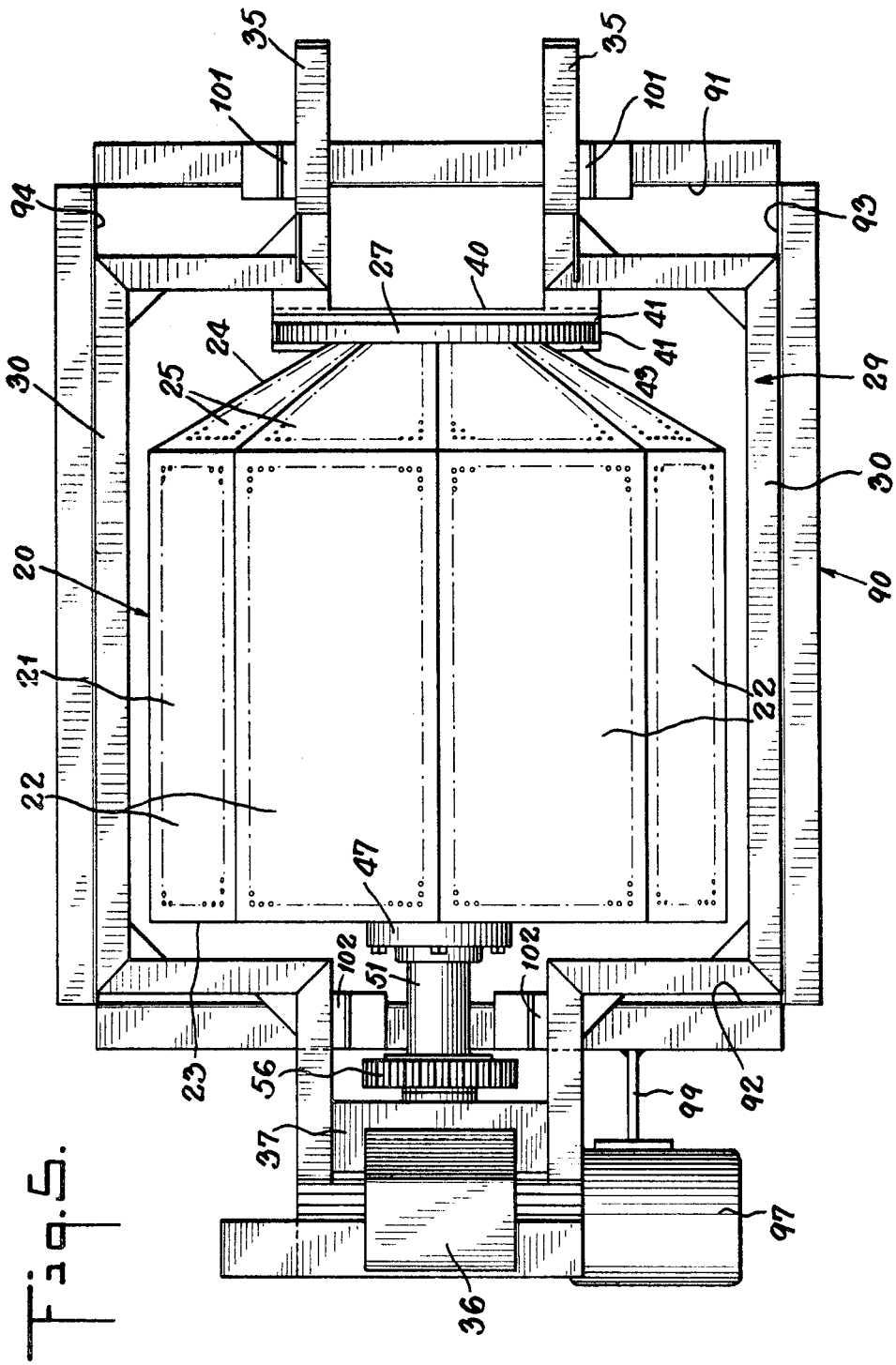

3,748,249
BARREL TYPE PROCESSING APPARATUS
James Barton, Grosse Point Woods, Mich., assignor to Ionic International Inc., Warren, Mich.
Filed Nov. 1, 1971, Ser. No. 194,260
Int. Cl. C23b 5/78
U.S. Cl. 204—214
35 Claims

ABSTRACT OF THE DISCLOSURE

Barrel-type processing apparatus including a portable barrel unit for the processing of workpieces in bulk. A hollow, perforated rotatable barrel having a polygonal shaped side wall, front and rear end walls and an uncovered entrance opening in the front end wall is mounted on a frame. A supporting carriage is tiltably mounted on trunnions on another frame, and the barrel-mounting frame and barrel are supported on the supporting carriage. A reversible motor and drive mechanism are mounted on the frame which tiltably mounts the carriage, for tilting or swinging the carriage and hence the barrel to a barrel-loading position wherein the barrel entrance opening faces in a generally upward direction and to a barrel unloading position wherein the entrance opening faces in a generally downward direction. Retaining members secured to the carriage serve to retain the barrel-mounting frame and barrel on the barrel before, during and after the tilting movement of the carriage to and from the barrel loading and unloading positions while permitting the barrel-mounting frame and barrel to be lifted as a unit from the carriage by a manual or program-controlled hoist when desired. Horns or members secured to the barrel-mounting frame enable the lifting of such frame and the barrel as a unit from the supporting carriage by the hoist, and the transporting and lowering of such frame onto an upper edge portion of a processing tank so that the barrel is suspended at the upper portion of the tank and extends within the tank interior and is partially immersed in a treating or processing liquid in the tank. Retaining members secured to the tank serve to retain the barrel-mounting frame and barrel on the tank upper portion while permitting such frame and barrel to be lifted as a unit from the tank by the hoist, when desired.

BACKGROUND OF THE INVENTION (1) Field of the invention

This invention relates to barrel-type processing apparatus and more particularly to barrel-type processing apparatus including a portable barrel unit and adapted for the processing of workpieces or articles in bulk.

(2) Description of the prior art

U.S. Patent 3,345,282 discloses a portable barrel plating unit wherein a plating barrel is rotatably mounted in a frame. A contact assembly is secured to the frame, the contact assembly including a pair of contact arms pivotably secured to the frame on either side of the frame for pivotal movement about a horizontal axis. The contact arms each have a forward electrical contact area formed thereon at the ends of each arm, and a flexible-member connects the ends of the contact arms together. The barrel and frame may be suspended as a unit in a container of plating liquid, by resting the contact arm contact areas on a cathode bar at one side of the container and resting the other end of the bars on the other end of the container.

In all present manual or automated horizontal barrel lines utilized in the plating industry, the barrels employ a cover or doors to close off the entrance opening of the barrel to retain the workpieces being processed. The closed off entrance opening eliminates automatic loading and unloading of the barrel, and hinders or renders it more difficult to dry the workpieces in the barrel.

OBJECTS OF THE INVENTION

One object of the present invention is to provide a new and improved barrel processing apparatus including a portable barrel unit for the processing of workpieces.

Another object of this invention is to provide a new and improved barrel processing apparatus including the portable barrel unit and which by means of its tiltably mounted supporting carriage for the barrel-mounting frame and hence the barrel, which supporting carriage is driven by a reversible power means and drive mechanism, swings or tilts the barrel without the need for manual lifting or pushing by the operator to a barrel-loading position wherein the barrel entrance opening faces in a generally upward direction and to a barrel-unloading position wherein the barrel entrance opening faces in a generally downward direction.

A further object is to provide a new and improved barrel processing apparatus including a portable barrel unit and wherein the barrel has a constantly open, substantially unobstructed entrance opening or mouth which permits automatic loading and unloading of the barrel and also facilitates drying of the processed workpieces in the barrel.

Still another object is to provide a new and improved barrel type processing apparatus including a portable barrel unit that is readily adapted for employment in existing processing installations, for instance existing plating installations.

An additional object is to provide for flexibility in existing processing installations, for instance existing plating installation, from the standpoint of being able to readily add on or eliminate a barrel processing station to or from the barrel processing line, as required or desired, by means of the new barrel processing apparatus of this invention.

A further object is to provide a new barrel-type processing apparatus including a portable barrel unit characterized by being efficient, chemical and heat-resistant, and easily maintained.

Another object is to provide a new and improved barrel processing apparatus wherein gear means of the portable barrel unit automatically engages and meshes with gear means mounted on the exterior of the rear wall of a processing tank, for instance an electroplating tank, when the portable barrel unit is lowered to a proper at rest position on the processing tank, the gear means of the tank being rotatable by a motor-driven drive mechanism whereby the barrel is rotated while suspended immersed in the processing liquid, for instance electroplating electrolyte.

A further object is to provide a new and improved barrel-type processing apparatus having a barrel which is readily lifted and lowered together with its mounting frame as a unit by a manual or automatically programmed hoist from and to respectively its tiltable supporting carriage, whereon the barrel rests during loading and unloading, and transported to and from a processing tank, for instance an electroplating tank, whereon the barrel-mounting frame rests on the tank upper edge surfaces during processing of the workpieces with the barrel suspended within the tank and immersed in the processing liquid, for instance a zinc elecroplating electrolyte, therein.

Additional objects and advantages will be apparent as the invention is hereinafter described.

BRIEF SUMMARY OF THE INVENTION

The barrel-type processing apparatus of this invention, which achieves the aforementioned objects and advantages, comprises a frame and a hollow, perforated rotatable barrel mounted on the frame, such barrel having a polygonal side wall, front and rear end walls, an entrance opening in the front end wall, and rotation-enabling means comprising a rotation-enabling assembly. A supporting carriage is tiltably mounted on another frame, and the barrel-mounting frame and barrel are supported on the supporting carriage. Power means are provided for tilting the carriage and hence the barrel-mounting frame and barrel to a position wherein the barrel entrance opening is facing in a generally upward position, and for tilting the carriage and hence the barrel-mounting frame and the barrel to a position wherein the barrel entrance opening is facing in a generally downward direction. Retaining means serve to retain the barrel-mounting frame and barrel on the supporting carriage before, during and after the tilting movement of the carriage to and from the position wherein the barrel entrance is facing in a generally upward position and in a generally downward position while permitting the barrel-mounting frame and the barrel to be lifted as a unit from the carriage when desired. Means or members secured to the barrel-mounting frame enable lifting of such frame and the barrel as a unit from the supporting carriage, transporting of such frame and the barrel a desired distance to a desired site, and lowering of this barrel-mounting frame and the barrel at the site and usually onto an upper portion of an open top container adapted to contain a treating liquid and of such dimensions as to receive the barrel at least partially therewithin. The barrel-mounting frame rests on the container upper portion in such fashion that the barrel extends within the interior of the container and is immersed in the treating liquid. Retaining means serve to retain the barrel-mounting frame on the container while permitting the barrel-mounting frame and the barrel to be lifted as a unit from the container when desired. Power means are provided for rotating the barrel while immersed in the treating liquid in the container.

In a preferred embodiment, the supporting carriage for the barrel, which carriage is tiltably mounted on a frame, has one or more generally horizontal side structural members, preferably a plurality of such side structural members, and spaced apart generally vertical front and rear structural members secured to the side structural members. One or more generally horizontal structural members, preferably a plurality of such structural members, interconnect the generally vertical front structural members, and one or more generally horizontal structural members, preferably a plurality of the last-mentioned structural members, interconnect the generally vertical rear structural members.

The frame mounting the supporting carriage, in a preferred embodiment, includes spaced apart front standards, and spaced apart rear standards, one or more generally horizontal side structural members, preferably a plurality of such side structural members, interconnecting the front and rear standards on each side of the frame, one or more generally horizontal structural members, preferably a plurality of such structural members, interconnecting the rear standards, and one or more generally horizontal structural members, preferably a plurality of the last-mentioned structural members, interconnecting the front standards. This frame is usually of greater width than that of the supporting carriage, and such carriage usually extends at least partially within a space within this frame.

The frame mounting the barrel preferably includes spaced apart side structural members, rear end structural members secured to the rear end portions of the side members, front end structural members secured to front end portions of the side members, and retention means for retaining the barrel on the frame. The front end members preferably extend incompletely and only partially in front of the barrel front end wall so as to leave unobstructed the entrance opening of the barrel.

The barrel is a hollow perforated shell having a polygonal side wall, front and rear end walls, and an entrance opening in the front end wall. The entrance opening is preferably a substantially unobstructed constantly open entrance opening to enable automatic loading and unloading of the barrel, as well as to facilitate drying of workpieces in the barrel. However, if desired, a cover or door or doors could be employed for closing such entrance opening when desired.

The barrel and its mounting frame are tilted while resting on the supporting carriage to a barrel loading position wherein the barrel entrance opening and the axis of rotation of the barrel are facing in a generally upward direction when loading of the barrel is desired. When unloading of the barrel is desired, the barrel and its mounting frame are tilted while resting on the supporting carriage to a barrel unloading position wherein the barrel entrance opening and axis of rotation of the barrel are facing in a generally downward direction. During processing of the workpieces in the barrel, the barrel-mounting frame rests on the upper portion of the processing container with the barrel suspended at least partially within the interior of the container or tank so as to be immersed at least partially in the treating or processing liquid therein, and with the entrance opening of the barrel and the axis of rotation of the barrel facing in a generally horizontal direction.

Upon lowering the barrel-mounting frame and the barrel onto the upper portion of the processing container with the mounting frame resting thereon, the rotation-enabling means of the barrel which includes a gear cooperates with the barrel-rotating means also including a gear mounted on the external surface of a wall of the container, whereby the barrel can be rotated while immersed in the processing or treating liquid in the container. In a preferred embodiment, a gear of the rotation-enabling means of the barrel meshes with a gear of the rotating means mounted on the container wall external surface upon lowering of the barrel-mounting frame and the barrel onto the container thereon, whereby the barrel can be rotated.

In a preferred embodiment, the barrel is a symmetrically constructed shell or receptacle adapted to rotate about a generally centrally located axis. Its polygonal side wall consists of panels of rectangular configuration arranged in the form of the polygonal side wall. Its front end wall preferably consists of panels of trapezoidal configuration arranged in the form of a generally frustopolygonal wall at the front end of the barrel, and the rear end wall of the barrel is preferably a flat wall of the polygonal configuration. The trapezoidal panels of the front end wall preferably terminate in outer edge portions surrounding the entrance opening.

The apparatus of this invention is especially well adapted for electroplating of the workpieces, for example electro-galvanizing of screws, bolts or other workpieces with zinc. However the apparatus is also utilizable for conversion coating of the workpieces, for example, phosphate conversion coating thereof, cleaning of the workpieces, de-rusting and deoxidizing of the workpiece, rinsing of the workpieces, and for other processing of the workpieces.

BRIEF DESCRIPTION OF THE SEVERAL VIEWS OF THE DRAWINGS

FIG. 2 is a perspective view of the barrel and its mounting frame supported on the tiltable carriage of apparatus of this invention, the carriage and hence the barrel being tilted in such fashion that the barrel is in a barrel-unloading position wherein its entrance opening faces in a generally downward direction;

FIG. 3 is an end elevational view showing the barrel mounted on the container adapted to contain treating fluid, and looking toward the entrance opening end of the barrel;

FIG. 4 is an end elevational view showing the barrel mounted on the container adapted to contain treating fluid, and looking toward the rear end of the barrel;

FIG. 5 is a top plan view of the barrel and its mounting frame mounted on the container adapted to contain treating fluid;

FIG. 11 is a side elevational view of the barrel-mounting frame of FIG. 7;

FIG. 12 is an enlarged sectional view taken on line 12—12 of FIG. 7; and

FIG. 13 is an enlarged vertical section taken on line 13—13 of FIG. 8.

With reference to FIGS. 1–6, 9 and 10, hollow, perforated rotatable barrel 20 of polypropylene is a symmetrically constructed receptable adapted to rotate about a generally centrally located axis. Barrel 20 has side wall 21 consisting of panels of rectangular configuration 22 which are arranged in the form of a polygonal shaped body or side wall, a generally flat bottom or rear end wall 23 of polygonal configuration at the rear end of such body, and top or front end wall 24 consisting of panels 25 of trapezoidal configuration arranged in the form of a generally frusto-polygonal shaped cover or wall at the front end of such body. The side wall 21 having rectangular sections 22 and top or front end wall 24 consisting of trapezoidal panels 25 is formed by welding together perforated strips or panels of polypropylene with each polypropylene strip consisting of a rectangular section and a trapezoidal section bent to form an acute angle with the rectangular section. Trapezoidal panels 25 of front end wall 24 terminate in outer edge portions which surround a generally centrally-located, relatively large polygonal entrance opening 26 through which workpieces to be treated are introduced into barrel 20. The side and top or front end walls 24 of the barrel are of polygonal shape, of octagonal shape as shown, for imparting desirable additional tumbling motion to the workpieces in the barrel upon its rotation. The side, rear end and front end walls 21, 23 and 24, respectively, of the barrel are perforated throughout their greater or major portion to enable treating or processing liquids or solutions to pass into and escape from the barrel interior. Prior to welding such strips or panels together, the perforations are drilled therein and the panel is heat softened at the juncture of the rectangular section and trapezoidal section to enable the trapezoidal section to be bent inwardly to form the acute angle with the rectangular section. Wall 23 of polypropylene is secured to side wall 21, by welding. Entrance opening 26 of the barrel enables the supply of workpieces to be processed into the barrel and the removal or withdrawal of processed workpieces from the barrel, opening 26 being preferably constantly uncovered or open. Annular member or outboard bearing 27 encompassing entrance opening 26 and having a circular outer periphery and a polygonal inner periphery is of thicker polypropylene than the polypropylene forming the side and end walls of the barrel, annular member 27 serving to protect the barrel during charging and removal of workpieces therefrom and during lifting and lowering of the barrel from and to its supporting carriage and from and to the processing tank hereinafter disclosed.

Figure 7:
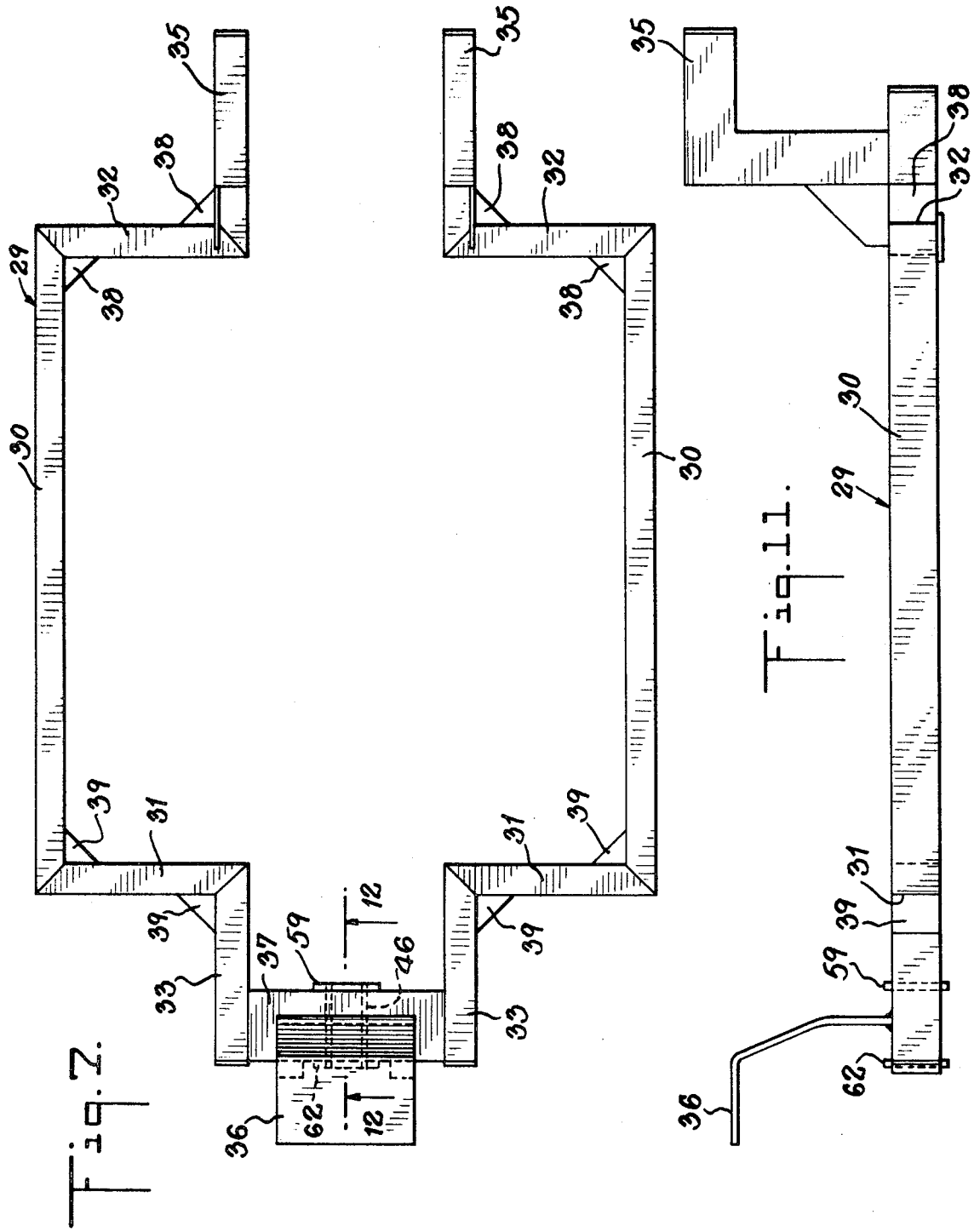
FIG. 7 is a top plan view of the barrel-mounting frame.

Rotatable barrel 20 is mounted on substantially centrally disposed frame 29, also shown in FIGS. 7 and 11. Frame 29 includes side structural members 30 of steel rectangular tubing, end structural members 31 of steel rectangular tubing welded to the ends of side members 30, and end structural members 32 and 33 of steel rectangular tubing welded to the opposite ends of side members 30. Front lifting and lowering horns or angular members 35 of steel rectangular tubing, which are substantially right angular members as shown, are welded to end members 32 at the front end portion of frame 29, and one or more of rear lifting and lowering horn or angular member 36 of steel is welded to connecting member 37 of steel rectangular tubing which is welded to and interconnects end members 33 at the rear end portion of frame 29. Each of angular members 35 and 36 comprises a generally vertical lower portion and a generally horizontal upper portion secured to the lower portion. When more than one of angular member 36 is utilized, this angular member is usually of narrower width than when one such angular member 36 is utilized. Gussets are designated at 38 and 39. Barrel 20 is mounted or supported at its front end on frame 29 by annular member 27 being received in and resting in a narrow pocket or receptacle of slightly larger width than that of member 27 and formed by steel bearing front plate or member 40, shown in FIG. 1, bolted to polypropylene front, rear and side members 41, 42 and 43, respectively. Bearing plate 40 is welded at upper generally horizontal extensions 44 of plate 40 to end members 32 of frame 29. Barrel 20 is supported at its rear end on frame 29 by means of its main shaft 45, shown in FIGS. 8 and 13 and extending through the central passageway of and retained in tubular housing or sleeve 46, shown in FIGS. 8, 12 and 13, which sleeve 46 is welded to frame 29. Main shaft 45 and sleeve 46 are of steel.

Figure 8:
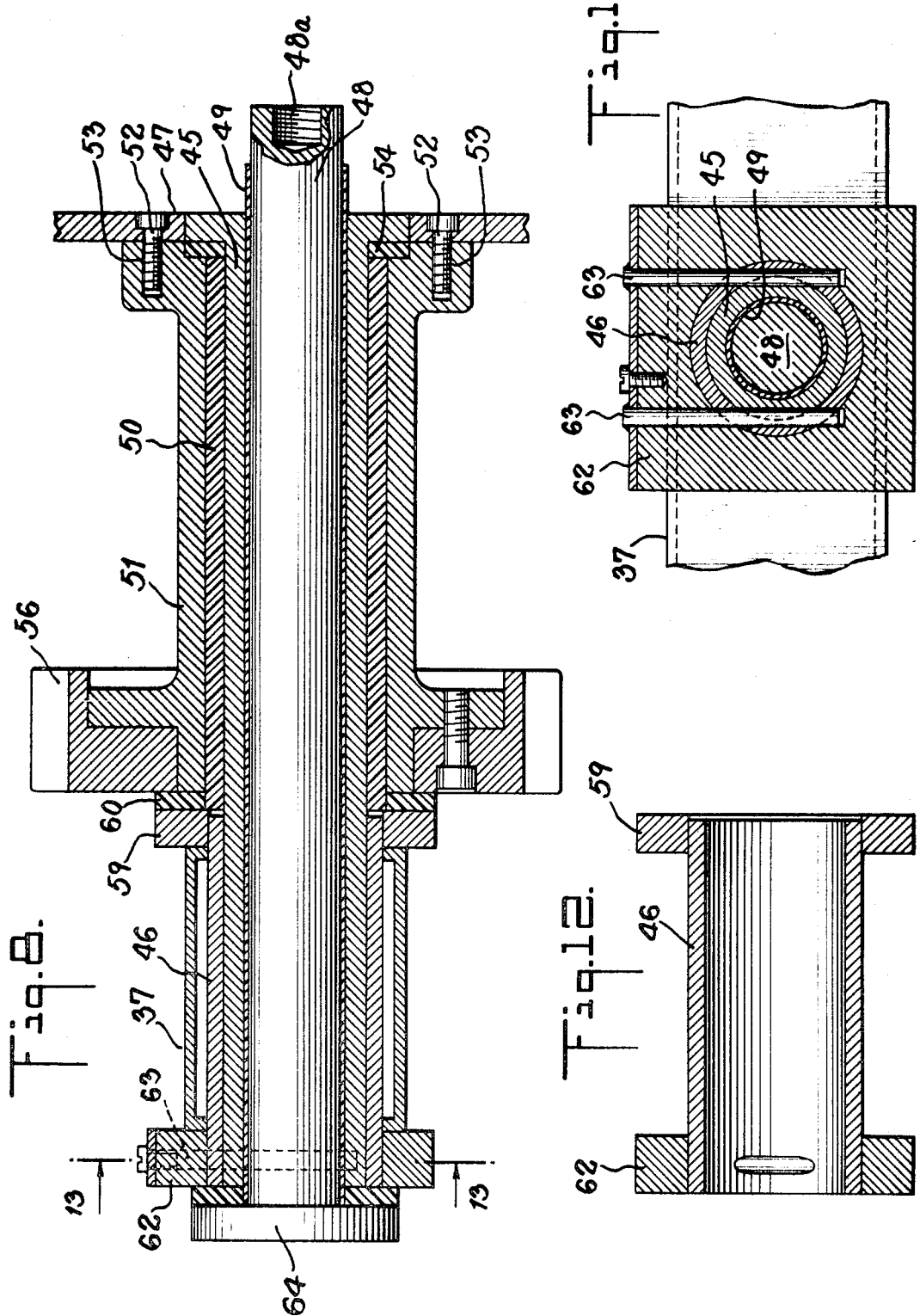
FIG. 8 is an enlarged longitudinal section through the electrical conductor-rotation enabling assembly of the barrel.
Figure 9:
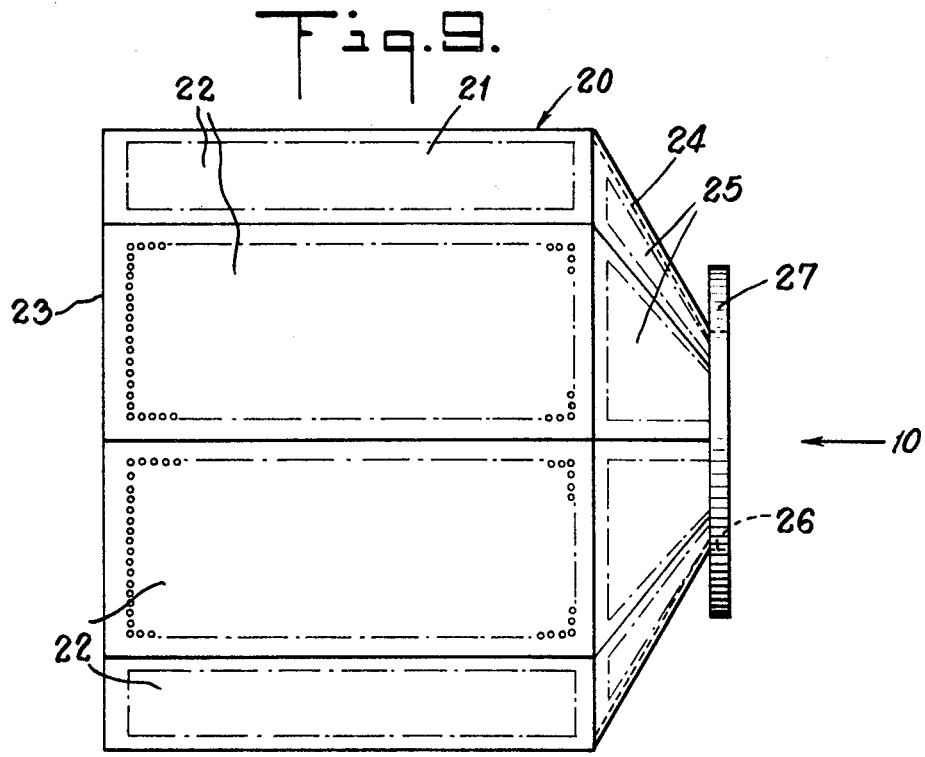
FIG. 9 is a side elevational view of the barrel.
Figure 10:
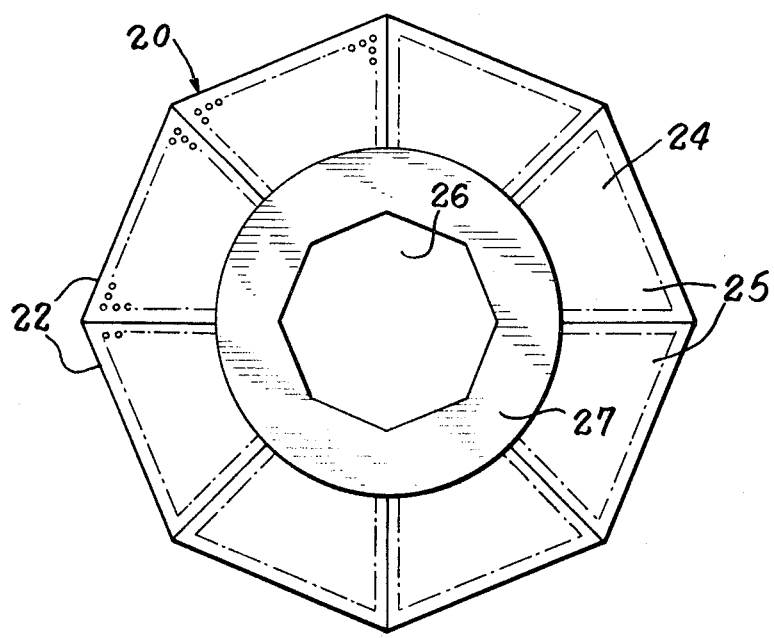
FIG. 10 is an elevational view of the barrel of FIG. 9 looking in the direction of arrow 10.

Referring to FIGS. 5 and 8, the electrical conductor-rotation enabling assembly of barrel 20 has mounting or face plate 47 of steel secured by bolting to rear end wall 23 of barrel 20. Electrical conductor tube 48 of copper, shown in FIGS. 8 and 13, is encompassed for a major portion of its length by electrical insulating bushing sleeve 49, for instance of Teflon. The inner end portion 48a, shown in FIG. 8, of conductor tube 48 extending within barrel 20 is internally threaded, and a cathode dangler contactor is screwed into the threaded end portion of conductor 48. Main shaft 45 is disposed about bushing 49 and bearing sleeve 50 of Teflon is disposed about a portion of shaft 45. Rotatable housing or hub 51 of steel is mounted over bearing sleeve 50, with rotatable housing or sleeve 51 being secured to mounting plate 47 by bolts 52. Bolts 52 extend through orifices in mounting plate 47 and into tapped blind cavities 53 in rotatable housing 51 which register with such orifices, the heads of bolts 52 being countersunk in plate 47. Thrust washer 54 is disposed between inner end portions of bushing 49. Pinion gear 56 of steel is mounted at the outer end portion of rotatable housing 51 and secured to housing 51 by bolt 57. Sleeve 46 is sized to accept non-rotatable shaft 45 with shaft 45 extending through sleeve 46 and being retained by sleeve 46. Sleeve 46 is welded to frame member 61 of frame 29. Annular member 59 of steel is mounted over the inner portion of sleeve 46. Thrust washer 60 is disposed on bearing 50 between member 59 and rotatable housing and pinion 51 and 56 respectively. Retainer 62, shown in FIGS. 8 and 13, serves to retain or hold together by means of two steel pins 63 the assembly of elements including the conductor 48, bushing 49, non-rotatable sleeve 46 and frame 61. Pins 63 extend through orifices in sleeve 46 and fit into and through retaining grooves in main shaft 45 to hold the assembly together. Conductor tube 48 terminates at its outer end portion in electrically conductive flange or shoe 64 for electrical contact purpose.

Figure 1:
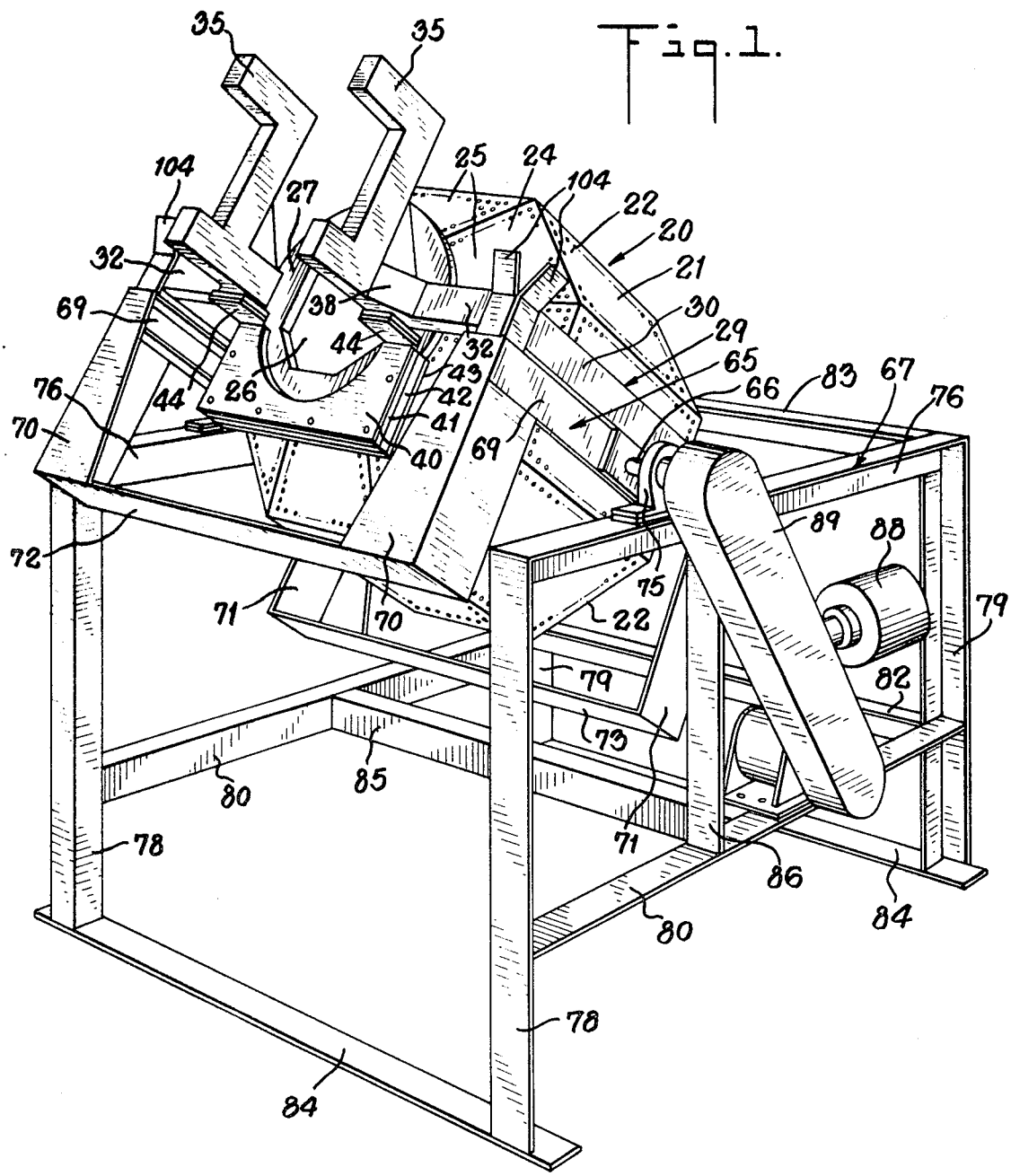
FIG. 1 is a perspective view of the barrel and its mounting frame supported on the tiltable carriage of apparatus of this invention, the carriage and hence the barrel being tilted in such fashion that the barrel is in a barrel-loading position wherein its entrance opening faces in a generally upward direction.
Figure 6:
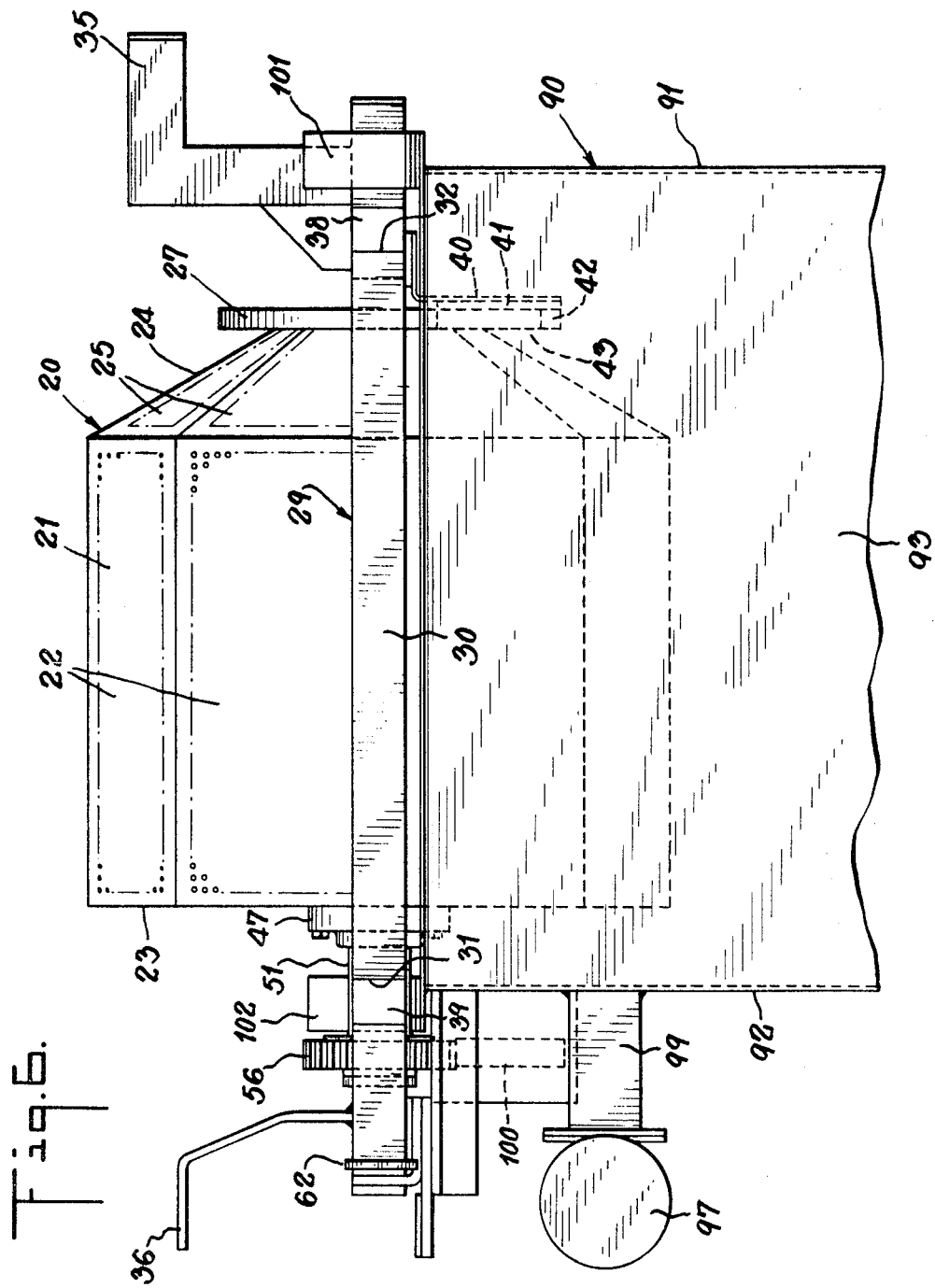
FIG. 6 is a side elevational view of the barrel and its mounting frame mounted on the container adapted to contain treating fluid.

Referring to FIGS. 1 and 2, supporting carriage 65 is tiltably mounted by means of trunnions 66 journaled on another frame 67 which is larger than supporting carriage 65. Frame 67 is so dimensioned as to receive carriage 65 within this frame, and to permit carriage 65 to extend downwardly an appreciable distance within frame 67. One end of frame 67, referred to herein as the front end, is open and unobstructed to provide clearance for tilting carriage 65 so as to move barrel 20 as desired or required to a barrel-loading position (shown in FIG. 1) wherein its entrance oepning 26 and its axis of rotation are facing in a generally upward direction, to a barrel unloading position (shown in FIG. 2) wherein its entrance opening and its axis of rotation are facing in a generally downward direction, or to a processing position wherein its entrance opening 26 and its axis of rotation are facing in a generally horizontal direction. Supporting carriage includes generally horizontal, spaced side structural members 69, generally vertical, spaced front and rear structural members 70 and 71 respectively welded at their upper end portions to the opposite end portions of side members 69, and generally horizontal spaced structural members 72 and 73 welded to and interconnecting the lower end portions of front and rear generally vertical members 70 and 71. Generally horizontal side members 69 were steel channels positioned in such manner that the channels faced laterally and inwardly of this frame, with the upper surfaces of side members 69 being substantially smooth or flat for the resting thereon of the barrel-mounting frame 29 and in particular side members 30 of frame 29. Generally vertical front and rear members 70 and 71 respectively were angle members of steel, and generally horizontal members 72 and 73 were flat strips of steel. Trunnions 66 journaled in bearings in pillow blocks 75 are secured at one end portion to side members 69 of the carriage 65 by means of nuts, bolts and washers. Pillow blocks 75 are mounted and secured by welding to the upper surfaces of generally horizontal side members 76 of frame 67.

Frame 67 includes generally vertical, spaced front and rear standards 78 and 79 respectively, which were steel angle members, and generally horizontal, spaced lower and upper side structural members 80 and 76 respectively, which were also steel angle members, welded to lower portions and top end portions respectively of standards 78 ad 79. Generally horizontal lower and upper rear end structural members 82 and 83 respectively, which were steel angle members, are welded to lower and top end portions of standards 79. Upper rear end structural member 83 is also welded to the end portions of upper side members 76. Base structural members 84, which were flat steel strips, are welded to the bottom ends of front and rear standards 78 and 79. Generally horizontal connecting member 85, which was a steel rectangular tube, is welded to an intermediate portion of lower side members 80. Generally vertical connecting member 86, which was a steel angle member is welded to lower and upper side members 80 and 76 on the tilting mechanism side of the frame. Reversible motor 88, which was a conventional reversible electric motor obtained in commerce, is drivingly coupled to and operates drive mechanism 89, which was a conventional chain drive mechanism obtained in commerce, for tilting carriage 65 and hence barrel 20 when present thereon to a desired position as is hereinbefore disclosed.

Referring now to FIGS. 3, 4, 5, and 6, tank 90 for the treating solution, for instance electrolyte for electroplating the workpieces, has front and back walls 91 and 92 respectively, side walls 93 and 94 and bottom wall 95. Tank 90 has an open, uncovered top for enabling barrel 20 to extend within its interior. Tank 90 may, if desired, be covered by a removable top cover when the barrel is not resting on the tank 90 and extending partially within its interior. Motor 97 and speed reducer drive mechanism 98 operated by motor 97, are mounted on rear wall 92 of the tank, by bolting to mounting bracket 99 which in turn is welded to the tank wall 92. Speed reducer drive 98 was obtained from Delco Products Division of General Motors Corp., Dayton, Ohio as Model No. M5FD. Pinion gear 100 driven by drive mechanism 98 and motor 97 meshes with pinion gear 56 mounted on main shaft 45 of the drive means for barrel 20 when the barrel 20 and its mounting frame is placed in proper position on tank 90 with the barrel 20 extending partially within the interior of tank 20. Retention and guide saddles 101 and 102 welded to the top edges or lips at the front and rear ends respectively of tank 90 serve to retain barrel 20 and its frame.

In operation, barrel 20 and its frame 29 resting on supporting carriage 65, shown in FIGS. 1 and 2, are moved to a loading position, shown in FIG. 1, wherein the principal axis or axis of rotation of barrel 20 is inclined upwardly and opening 26 of the barrel faces in a generally upward direction. The workpieces to be processed are then introduced into barrel 20 through opening 26, for instance by means of a belt conveyor. Barrel 20 and its mounting frame 29 are tilted to such loading position by operation of reversible drive motor 88 coupled to drive mechanism 89 which tilts supporting carriage 65 mounted on trunnions 66. After loading of barrel 20 is completed, barrel 20 and its frame 29 resting on carriage 65 is usually moved to a lifting removal position on carriage 65 for lifting from the carriage and wherein the principal axis or axis of rotation of the barrel is oriented generally horizontally and entrance opening 26 of the barrel faces in a generally horizontal direction. Barrel 20 and its frame 29 are lifted from carriage 65 by means of a hoist (not shown) having its arms, cables, chains or other suspending members disposed about front horns 35 (shown in FIG. 1) and rear horn 36 (shown in FIG. 2). Barrel 20 and its mounting frame are tilted to this lifting removal position prior to being lifted from carriage 65, by operation of reversible drive motor 88 and drive mechanism 89 coupled thereto.

Barrel 20 and its mounting frame 29 are then transported by the hoist to tank 90, shown in FIGS. 3, 4, 5 and 6, containing the processing liquid, and the barrel 20 and its frame are then lowered by the hoist to rest in proper position on the upper edge of tank 90 with the aid of the front and rear guide and retention saddles or members 101 of tank 90. With barrel 20 and its frame lowered to rest in proper position on tank 90, pinion gear 56 mounted on the drive shaft for rotating the barrel 20 automatically meshes with pinion gear 100 driven by drive mechanism 98 and motor 97 mounted on the tank 90. Barrel 20 extends downwardly a substantial distance in tank 90 with barrel 20 being partially immersed in the processing liquid in tank 90. Motor 97 is operated to thereby operate drive mechanism 98 and drive pinion 100 and also pinion 56 in meshing engagement therewith whereby barrel 20 is rotated in the processing liquid in tank 90. Barrel 20 and its frame 29 rests in proper processing position on tank 90 and barrel 20 rotated while so resting thereon with the principal axis or axis of rotation of barrel 20 oriented generally horizontally and opening 26 of the barrel facing in a generally horizontal position. Tank 90 is typically of dimensions of 42" length x 36" width x 36" depth in the single tank size. Barrel 20 is typically of dimensions of 30" diameter x 30" overall length.

When the processing of the workpieces in barrel 20 in the processing liquid of tank 90 is completed, barrel 20 and its supporting frame 29 and its contents of workpieces is lifted from tank 90 by means of the hoist with its arms, cables, chains or other flexible suspending members disposed about front horns 35 and rear horn 36, and transported back to the supporting carriage 65 and lowered to rest on carriage 65. Guide and retention members 104 and 105 at the front and rear ends respectively of carriage 65, shown in FIGS. 1 and 2, facilitate the lowering of barrel 20 and its frame onto the proper resting position on the carriage 65. Carriage 65 and the barrel 20 resting thereon is then moved downwardly, as shown in FIG. 2, to the unloading position wherein the principal axis or axis of rotation of barrel 20 is oriented generally downwardly and opening 26 of the barrel faces in a generally downward direction. The processed workpieces are discharged or removed from the barrel 20 through opening 26 with the barrel in this unloading position, for instance on a belt conveyor or on or by other suitable means.

The hoist for lifting the barrel 20 and its supporting frame 29 from the carriage 65 and for transporting and lowering such barrel and its frame onto tank 90, as well as for lifting such barrel and its frame 29 from tank 90 and returning the barrel to and lowering it onto carriage 65 can be a manual hoist or an automated, programmed hoist, both of which are readily obtainable in commerce. However, any suitable apparatus is utilizable herein for lifting and lowering and transporting the barrel 20 and its supporting frame 29 for the purposes set forth supra.

The particular material of fabrication of barrel 20 is dependent on the use for which the barrel is destined. The barrel 20 was of polypropylene for zinc electroplating of the workpieces, and such barrel can be fabricated of stainless steel for phosphate conversion coating, cleaning or de-rusting of the workpieces. The supporting frame 29, frame 67 and carriage 66 mounted thereon and tank 90 were of epoxy-coated steel. The perforations were drilled in barrel 20. The barrel can also be fabricated of steel for electroplating provided the steel is covered with an electrical insulating coating of epoxy or other suitable dielectric material.

While certain features of the invention have been disclosed herein, and are pointed out in the annexed claims, it will be understood that, in accordance with the doctrine of equivalents, various omissions, substitutions and changes may be made by those skilled in the art without departing from the spirit of the invention.

What is claimed is:

1. A processing apparatus comprising a frame, a hollow, perforated rotatable barrel mounted on the frame, the barrel having a polygonal side wall, front and rear end walls, an entrance opening in the front end wall, and means enabling rotation of the barrel, a supporting carriage tiltably mounted on another frame, the barrel-mounting frame and the barrel being supported on the carriage, means for tilting the carriage and hence the barrel-mounting frame and barrel to a position wherein the barrel entrance opening is facing in a generally upward direction and for tilting the carriage and hence the barrel-mounting frame and the barrel to a position wherein the barrel entrance opening is facing in a generally downward direction, means for retaining the barrel-mounting frame and barrel on the supporting carriage before, during and after the tilting movement of the carriage to and from the positions wherein the barrel entrance opening is facing in a generally upward direction and in a generally downward position while permitting the barrel-mounting frame and the barrel to be lifted as a unit from the carriage when desired, and means secured to the barrel-mounting frame for lifting the barrel-mounting frame and the barrel as a unit from the supporting carriage and for lowering of the barrel-mounting frame and the barrel onto an upper portion of an open top container adapted to contain a treating liquid and of such dimensions as to receive the barrel, the barrel-mounting frame resting on the container upper portion in such fashion that the barrel extends at least partially within the interior of the container, and means for rotating the barrel while extending within the container.

2. A processing apparatus comprising a frame, a hollow, perforated rotatable barrel mounted on the frame, the barrel having a polygonal side wall, front and rear end walls, an entrance opening in the front end wall, and means enabling rotation of the barrel, a supporting carriage tiltable mounted on another frame, the last-mentioned frame being of greater width than that of said carriage and said carriage extending at least partially within a space within the last-mentioned frame, the barrel-mounting frame and the barrel being supported on the carriage, power means for tilting the carriage and hence the supported barrel-mounting frame and barrel to a barrel-loading position wherein the barrel entrance opening is facing in a generally upward direction when barrel loading is desired and for tilting the carriage and hence the barrel to a barrel-unloading position wherein said opening is facing in a generally downward direction when barrel unloading is desired, means for retaining the barrel-mounting frame on the supporting carriage before, during and after the tilting movement of the carriage to and from the barrel-loading and unloading positions while permitting the barrel-mounting frame and the barrel to be lifted from the carriage when desired, means secured to the barrel-mounting frame for lifting of the barrel-mounting frame and the barrel as a unit off the supporting carriage and for lowering of the barrel-mounting frame and the barrel onto an upper portion of an open top container, the open top container adapted to contain a treating liquid and of such dimensions as to receive the barrel, the barrel-mounting frame resting on the container upper portion in such fashion that the barrel extends within the interior of container, and means for rotating the barrel while extending within the container.

3. The apparatus of claim 1 wherein the supporting carriage comprises spaced apart side structural members, spaced apart generally vertical front and rear structural members secured to the side structural members, at least one structural member interconnecting the front structural members, and at least one structural member interconnecting the rear structural members.

4. The apparatus of claim 2 wherein the supporting carriage comprises spaced apart side structural members, spaced apart generally vertical front and rear structural members secured to the side structural members, at least one structural member interconnecting the front structural members, and at least one structural member interconnecting the rear structural members.

5. The apparatus of claim 4 wherein the barrel-mounting frame comprises spaced apart side members, rear end members secured to the rear end portions of the side members, front end members secured to front end portions of the side members, and retention means for retaining the barrel on the frame, said front end members extending only partially in front of the barrel front end wall so as to leave unobstructed the entrance opening of the barrel.

6. The apparatus of claim 2 wherein the frame mounting the supporting carriage includes spaced apart front and rear standards, at least one side structural member interconnecting the front and rear standards on each side, at least one structural member interconnecting the rear standards, and at least one structural member interconnecting the front standards.

7. The apparatus of claim 6 wherein the front end portion of the frame mounting the supporting carriage is free of any structural members interconnecting intermediate portions and upper portions of the front standards.

8. The apparatus of claim 7 wherein the frame mounting the supporting carriage has substantially horizontal front and rear structural members interconnecting the bottom portions of the front standards and of the rear standards.

9. The apparatus of claim 1 wherein the supporting carriage is tiltably mounted on trunnions on the frame and the means for tilting the carriage is a reversible motor and drive mechanism.

10. The apparatus of claim 2 wherein the supporting carriage is tiltably mounted on trunnions on the frame and the reversible means for tilting the carriage is a reversible motor and drive mechanism mounted on said frame.

11. The apparatus of claim 1 wherein the barrel rotation-enabling means is a rotation-enabling assembly secured to the barrel rear end wall, comprising a shaft, bearing means disposed on the shaft, a rotatable housing mounted on said bearing means, and means for holding the assembly together.

12. The apparatus of claim 2 wherein the barrel rotation enabling means is a rotation enabling assembly secured to the barrel rear end wall, said assembly comprising a shaft, bearing means disposed on the shaft, a rotatable housing mounted on said bearing means, and means for holding the assembly together.

13. The apparatus of claim 11 wherein the assembly is an electrical conductor-rotation enabling assembly comprising a cylindrical shaft, an electrical conductor element extending within the shaft and into the barrel interior, said electrisal conductor terminating as an electrical conductor shoe at an outer end portion of the shaft exteriorly of the barrel, electrical insulating bushing means between the shaft and said conductor, the bearing means on an intermediate and inner end portion of the shaft, the rotatable housing mounted on the bearing means, and means for holding the assembly together.

14. The apparatus of claim 12 wherein the assembly is an electrical conductor-rotation enabling assembly comprising a cylindrical shaft, an electrical conductor element extending within the shaft and into the barrel interior, said electrical conductor terminating as an electrical conductor shoe at an outer end portion of the shaft exteriorly of the barrel, electrical insulating bushing means between the shaft and said conductor, the bearing means on an intermediate and inner end portion of the shaft, the rotatable housing mounted on the bearing means, and means for holding the assembly together.

15. The apparatus of claim 13 wherein a gear is fixedly mounted on the rotatable housing.

16. The apparatus of claim 15 wherein the gear is a pinion.

17. The apparatus of claim 14 wherein a gear is fixedly mounted on the rotatable housing.

18. The apparatus of claim 17 wherein the gear is a pinion.

19. The apparatus of claim 2 wherein the barrel is a symmetrically constructed receptacle adapted to rotate about a generally centrally located axis, the polygonal side wall thereof consists of panels of rectangular configuration arranged in the form of a polygonal shaped side wall, the front end wall consists of panels of trapezoidal configuration arranged in the form of a generally frusto-polygonal wall at the front end of the barrel, and the rear end wall thereof a generally flat bottom wall of polygonal configuration at the rear end of the barrel, the trapezoidal panels of said front end walls terminating in outer edge portions surrounding the entrance opening.

20. The apparatus of claim 2 wherein the means for lifting of the barrel-mounting frame and the barrel as a unit off the supporting carriage comprises spaced angular members secured to a front end portion of the barrel-mounting frame and at least one angular member secured to a rear end portion of the barrel-mounting frame.

21. The apparatus of claim 20 wherein two angular members are secured to the front end portions of the barrel-mounting frame, the angular members secured to the front end portions of the barrel-mounting frame and the one or more angular members secured to the rear end portion of the barrel mounting frame each having a generally vertical lower portion and a generally horizontal portion secured to the generally vertical lower portion.

22. The apparatus of claim 17 wherein a relatively thick annular member is secured to the front end wall of the barrel and encompasses the entrance opening thereof.

23. The apparatus of claim 2 wherein the means for retaining the barrel-mounting frame on the supporting carriage comprises spaced apart generally vertical members secured to the upper surfaces of the front and rear end portions of the said carriage.

24. The apparatus of claim 23 wherein the spaced apart generally vertical members each include lower generally vertical members, and upper outwardly-extending members for facilitating lowering of the barrel-mounting frame onto the supporting carriage.

25. The apparatus of claim 22 wherein the barrel is mounted on the barrel-mounting frame member by the thick annular member of the barrel being received within a pocket secured to said frame and of width slightly larger than the width of said annular member and formed by spaced apart front, rear and side members, and an electrical conductor-rotation enabling assembly secured to the barrel and to the barrel mounting frame.

26. The apparatus of claim 1 wherein the open top container adapted to contain the treating liquid has means on its upper edge portion for retaining the barrel-mounting frame on the upper portion of the container with the barrel extending within the container interior while enabling the barrel-mounting frame and the barrel to be lifted as a unit from the container when desired.

27. The apparatus of claim 26 wherein the open top container has means for rotating the barrel mounted on an exterior wall surface thereof, the barrel-rotating means of said container cooperating with the rotation enabling means of the barrel to rotate the barrel when desired.

28. The apparatus of claim 2 wherein the open top container adapted to contain the treating liquid has means on its upper edge portion for retaining the barrel-mounting frame on the upper portion of the container with the barrel extending within the container interior while permitting the barrel-mounting frame and the barrel to be lifted as a unit from the container when desired.

29. The apparatus of claim 28 wherein the open top container has means for rotating the barrel mounted on an exterior wall surface thereof, the barrel-rotating means of said container cooperating with the rotation enabling means of the barrel to rotate the barrel when desired.

30. The apparatus of claim 27 wherein the barrel rotating means mounted exteriorly on the container wall surface comprises a motor drivingly coupled to a drive mechanism and a pinion mounted exteriorly on the container rear wall surface, the pinion being rotated by the drive mechanism and meshing with a pinion of the rotation enabling means of the barrel.

31. The apparatus of claim 30 wherein the motor and drive mechanism are both mounted exteriorly on the container rear wall surface.

32. The apparatus of claim 29 wherein the barrel rotating means mounted exteriorly on the container wall surface comprises a motor drivingly coupled to a drive mechanism and a pinion mounted exteriorly on the container rear wall surface, the pinion being rotated by the drive mechanism and meshing with a pinion of the rotation enabling means of the barrel.

33. The apparatus of claim 32 wherein the motor and drive mechanism are both mounted exteriorly on the container rear wall surface.

34. A processing apparatus comprising a frame, a hollow, perforated rotatable barrel mounted on the frame, the barrel having a polygonal side wall, front and rear end walls, an entrance opening in the front end wall, and means enabling rotation of the barrel, a supporting carriage tiltable mounted on another frame, the last-mentioned frame being of greater width than that of said carriage and the carriage extending at least partially within a space within the carriage mounting frame, the barrel-mounting frame and the barrel being supported on the carriage, power means for tilting the carriage and hence the supported barrel-mounting frame and barrel to a barrel-loading position wherein the barrel entrance opening is facing in a generally upward direction when barrel loading is desired and for tilting the carriage and hence the barrel to a barrel-unloading position wherein said opening is facing in a generally downward direction when barrel unloading is desired, means for retaining the barrel-mounting frame and barrel on the supporting carriage before, during and after the tilting movement of the carriage to and from the barrel-loading and unloading positions while permitting the barrel-mounting frame and tre barrel to be lifted from the carriage when desired, and means secured to the barrel-mounting frame and the barrel to be lifted from the car- and the barrel as a unit off the supporting carriage and for lowering of the barrel-mounting frame and the barrel onto an upper portion of an open top container.

35. A processing apparatus comprising a frame, a hollow, perforated rotatable barrel mounted on the frame, the barrel having a polygonal side wall, front and rear end walls, an entrance opening in the front end wall, and means enabling rotation of the barrel, a supporting carriage tiltably mounted on another frame, the barrel-mounting frame and the barrel being supported on the carriage, means for tilting the carriage and hence the barrel-mounting frame and barrel to a position wherein the barrel entrance opening is facing in a generally upward direction and for tilting the carriage and hence the barrel-mounting frame and the barrel to a position wherein the barrel entrance opening is facing in a generally downward direction, means for retaining the barrel-mounting frame and barrel on the supporting carriage before, during and after the tilting movement of the carriage to and from the positions wherein the barrel entrance opening is facing in a generally upward direction and in a generally downward position while permitting the barrel-mounting frame and the barrel to be lifted as a unit from the carriage when desired, and means secured to the barrel-mounting frame for lifting the barrel-mounting frame and the barrel as a unit from the supporting carriage and for lowering the barrel-mounting frame and the barrel at a desired site.

References Cited
UNITED STATES PATENTS

| | | | |
|---|---|---|---|
| 3,429,797 | 2/1969 | Jackson et al. | 204—214 |
| 3,345,282 | 10/1967 | Jenks | 204—214 |

F. C. EDMUNDSON, Primary Examiner

U.S. Cl. X.R.

118—19, 418; 134—134, 157; 204—201; 259—89

UNITED STATES PATENT OFFICE
CERTIFICATE OF CORRECTION

Patent No. 3,748,249  Dated July 24, 1973

Inventor(s) James Barton

It is certified that error appears in the above-identified patent and that said Letters Patent are hereby corrected as shown below:

Column 7, line 11, "oepning" should read -- opening --. Column 9, line 72, "tiltable" should read -- tiltably --. Column 11, line 14, "electrisal" should read -- electrical --. Column 12, line 64, "tiltable" should read -- tiltably --. Column 13, line 6, "tre" should read -- the --; line 8, the phrase "and the barrel to be lifted from the car-" should be deleted and the phrase -- for lifting of the barrel-mounting frame -- substituted therefor.

Signed and sealed this 2nd day of April 1974.

(SEAL)
Attest:

EDWARD M. FLETCHER, JR.
Attesting Officer

C. MARSHALL DANN
Commissioner of Patent